United States Patent
Eshghi

(10) Patent No.: US 11,012,421 B2
(45) Date of Patent: May 18, 2021

(54) PREDICTING USER-FILE INTERACTIONS

(71) Applicant: Box, Inc., Redwood City, CA (US)

(72) Inventor: Kave Eshghi, Los Altos, CA (US)

(73) Assignee: Box, Inc., Redwood City, CA (US)

( * ) Notice: Subject to any disclaimer, the term of this patent is extended or adjusted under 35 U.S.C. 154(b) by 204 days.

(21) Appl. No.: 16/115,069

(22) Filed: Aug. 28, 2018

(65) Prior Publication Data

US 2020/0076768 A1    Mar. 5, 2020

(51) Int. Cl.
*H04L 29/06* (2006.01)
*G06N 7/00* (2006.01)
*G06F 16/901* (2019.01)

(52) U.S. Cl.
CPC ........ *H04L 63/029* (2013.01); *G06F 16/9024* (2019.01); *G06N 7/005* (2013.01); *H04L 63/1425* (2013.01)

(58) Field of Classification Search
CPC . H04L 64/1425; H04L 64/29; H04L 63/1425; H04L 63/29; G06F 16/9024; G06F 21/6218
USPC .......................................................... 726/27
See application file for complete search history.

(56) References Cited

U.S. PATENT DOCUMENTS

| | | | | |
|---|---|---|---|---|
| 7,176,791 B2 * | 2/2007 | Sakaki | ..................... | G06F 21/55 340/500 |
| 10,296,520 B1 * | 5/2019 | Ganesh | ................. | G06F 16/285 |
| 2010/0312726 A1 * | 12/2010 | Thompson | ............. | G06N 20/00 706/12 |

OTHER PUBLICATIONS

Beutel, Alex, Leman Akoglu, and Christos Faloutsos. "Graph-based user behavior modeling: from prediction to fraud detection." Proceedings of the 21th ACM SIGKDD international conference on knowledge discovery and data mining. 2015.
Beutel, Alex. "User behavior modeling with large-scale graph analysis." Computer Science Department, Carnegie Mellon University (2016).
Zhang, Wei, et al. "Network-based machine learning and graph theory algorithms for precision oncology." NPJ precision oncology 1.1 (2017): 1-15.
Almeida, Aitor, and Gorka Azkune. "Predicting human behaviour with recurrent neural networks." Applied Sciences 8.2 (2018): 305.
Schneible, Joe. "The Intersection of Large-Scale Graph Analytics and Deep Learning", URL:https://devblogs.nvidia.com/intersection-large-scale-graph-analytics-deep-learning/, Sep. 26, 2016.
Pan, Shimei, and Tao Ding. "Automatically Infer Human Traits and Behavior from Social Media Data." arXiv preprint arXiv:1804.04191 (2018).
Aasman, Jans. "Solidifying security analytics with artificial intelligence knowledge graphs", URL:https://www.infoworld.com/article/3269728/solidifying-security-analytics-with-artificial-intelligence-knowledge-graphs.html, May 4, 2018.
Schindler, Timo. "Anomaly detection in log data using graph databases and machine learning to defend advanced persistent threats." arXiv preprint arXiv:1802.00259 (2018).

(Continued)

*Primary Examiner* — Longbit Chai

(74) *Attorney, Agent, or Firm* — Vista IP Law Group, LLP

(57) ABSTRACT

Disclosed is an improved systems, methods, and computer program products that use a cluster-based probability model to perform anomaly detection, where the clusters are based upon entities and interactions that exist in content management platforms.

21 Claims, 12 Drawing Sheets

(56) References Cited

OTHER PUBLICATIONS

Wang, Gang, et al. "Clickstream user behavior models." ACM Transactions on the Web (TWEB) 11.4 (2017): 1-37.
Augustyniak, Piotr, and Grażyna Ślusarczyk. "Graph-based representation of behavior in detection and prediction of daily living activities." Computers in biology and medicine 95 (2018): 261-270.

* cited by examiner

PREDICTING USER-FILE INTERACTIONS

BACKGROUND

The proliferation of cloud-based services and platforms continues to increase. Specifically, cloud-based content management services and platforms have impacted the way personal and corporate information is stored, and has also impacted the way personal and corporate information is shared and managed. Individuals can avail themselves of such storage and management services to store and share large volumes of content objects such as files and documents.

Enterprises (e.g., companies, firms, etc.) might also want to use cloud-based content management platforms to secure, store and manage proprietary content objects, while enhancing the experience and productivity of their workforce (e.g., active employees) and/or their customers (e.g., clients, vendors, contractors, partners, etc.). For example, the enterprise might want to provide their active employees access to the flexible provisioning (e.g., access, roles, sharing, etc.) and collaboration components (e.g., tasks, comments, workflow, etc.) delivered by a content management platform provider.

While a key benefit of using such cloud-based systems is the ability to easily share content among users, issues may arise when the cloud-based system is employed to store and share content that is considered sensitive or proprietary (e.g., strategic documents, product specifications, financial statements, etc.), and where dangerous user behaviors may occur with respect to access of the files in the cloud-based system. It is highly desirable to be able to detect if files are being accessed in ways that are indicative of external infiltration, disgruntled employees, stolen credentials, or the like.

Various legacy techniques have been implemented to provide security to documents. For example, many systems implement security at the firewall level that seek to prevent improper access by third parties. However, such systems, while useful to prevent certain types of known attacks, may become useless if the system is successfully penetrated by a third party that are now accessing the enterprise's confidential files. Other legacy techniques may employ rules, filters, or learning algorithms to check for harmful behavior. However, conventional solutions are not specifically designed or optimized to address the unique types of accesses and interactions that occur in cloud-based content management platforms.

The problem to be solved is therefore rooted in technological limitations of the legacy approaches. Improved techniques, in particular improved application of technology, are needed to address the problem of implementing document and file security in content management platforms.

What is needed is a technique or techniques to improve the application and efficacy of various technologies as compared with the application and efficacy of legacy approaches.

SUMMARY

The present disclosure provides improved systems, methods, and computer program products suited to address the aforementioned issues with legacy approaches. More specifically, the present disclosure provides a detailed description of techniques used in systems, methods, and in computer program products for using a cluster-based probability model to perform anomaly detection, where the clusters are based upon entities and interactions that exist in content management platforms.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

DETAILED DESCRIPTION

Some embodiments of the present disclosure provide improved systems, methods, and computer program products suited to address the aforementioned issues with legacy approaches for anomaly detection. More specifically, the present disclosure provides a detailed description of techniques used in systems, methods, and in computer program products for using a cluster-based probability model to perform anomaly detection, where the clusters are based upon entities and interactions that exist in content management platforms.

Figure 1:
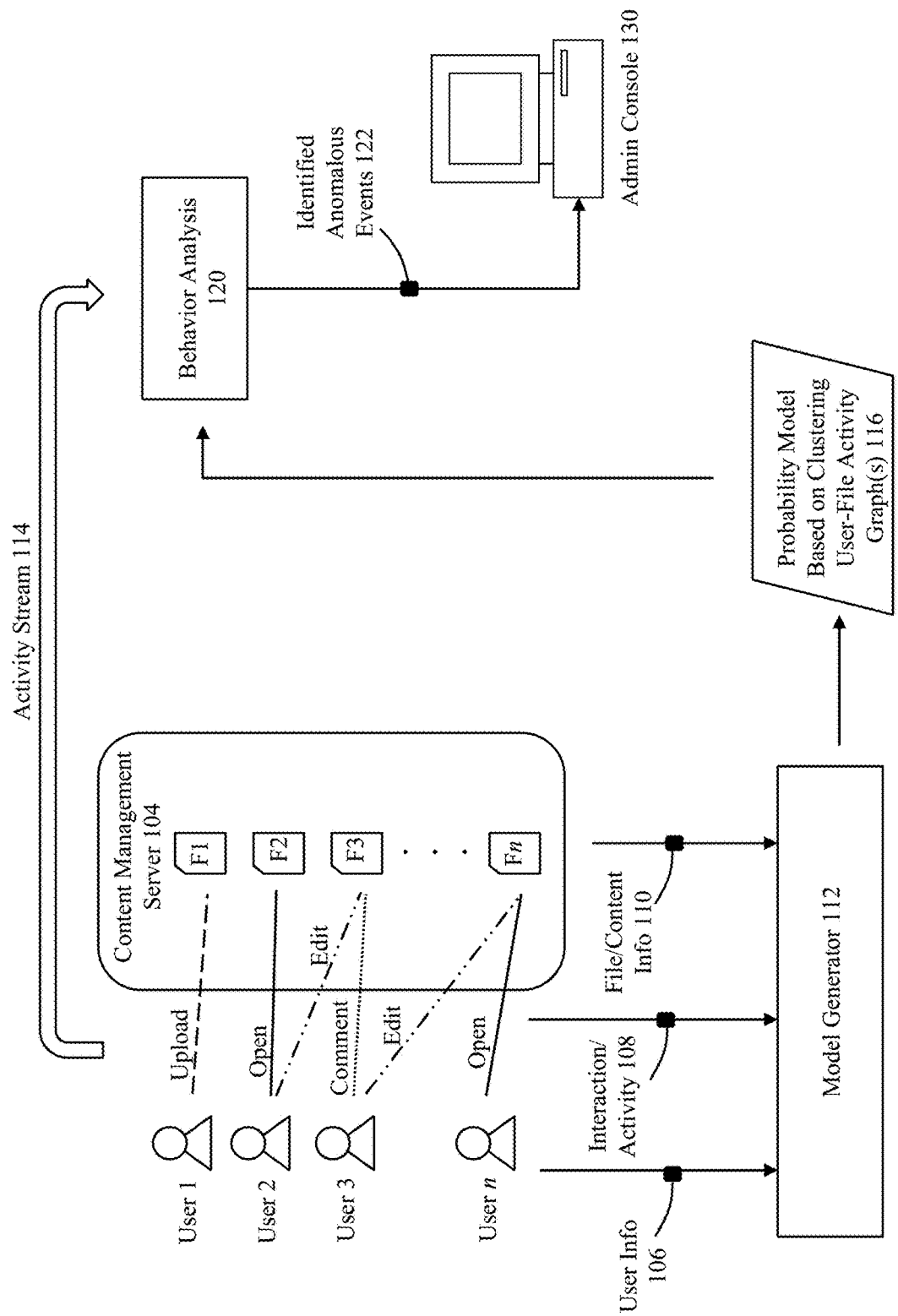
FIG. 1 shows a system to perform anomaly detection according to some embodiments of the invention.

FIG. 1 illustrates an example diagram of a system having a content management server 104 of a cloud service (e.g., collaboration or file sharing platform) and/or cloud storage accounts with capabilities for enabling a desktop application such as described herein for accessing a cloud-based collaboration platform. The system depicted in FIG. 1 may be broadly referred to as a cloud-based collaboration platform.

One or more users may use one or more client devices to access the content management server 104. The client devices can be any system and/or device, and/or any combination of devices/systems that is able to establish a connection, including wired, wireless, cellular connections with another device, a server and/or other systems such as server 104. The client devices will typically include a display and/or other output functionalities to present information and data exchanged between among the devices and/or the server 104. For example, the client devices can include mobile, hand held or portable devices or non-portable devices and can be any of a server desktop, a desktop computer, a computer cluster, or portable devices including, a notebook, a laptop computer, a handheld computer, a palmtop computer, a mobile phone, a cell phone, a smart phone, a PDA, a Blackberry device, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. running on any platform or any operating system (e.g., Mac-based OS (OS X, iOS, etc.), Windows-based OS (Windows Mobile, Windows, etc.), Android, Blackberry OS, Embedded Linux platforms. In one embodiment, the client devices and the server 104 are coupled via a network. In some embodiments, the devices and server 104 may be directly connected to one another. The input mechanism on the client devices can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at the client devices through one or more of the above input mechanism, or others, can be used in the disclosed technology by any user or collaborator (hereinafter referred to collectively as "user") for accessing a cloud-based collaboration platform or online collaboration platform (e.g., hosted by the host server 104).

The collaboration platform or environment hosts workspaces with content items that one or more users can access (e.g., view, edit, update, revise, comment, download, preview, tag, or otherwise manipulate, etc.). To host the content items, the collaboration platform may store the uploaded content items in a data repository. The data repository may represent the collective data storage facilities of the cloud-based collaboration platform and may include any one data storage components operating at any one or more physical devices. For example, the data repository may be distributed across multiple network connected machines. As mentioned, the data repository may store digital content that is hosted in the cloud-based collaboration platform (i.e., content uploaded by users/collaborators). The data repository may also store code including the instructions, rules, models, etc. for performing one or more processes of the cloud-based collaboration platform. For example, the cloud-based collaboration platform may host various user-facing applications (e.g., Microsoft® Word) that can be used by users/collaborators for interacting with stored digital content. Similarly, the cloud-based collaboration platform may host various processing applications that operate in the background, for example, to perform various automated tasks.

A content item (F1-Fn) stored/accessed within the cloud-based collaboration platform can generally include any type of digital or electronic content that can be viewed or accessed via an electronic device. The digital content can include, for example, pdf files, docs, slides (e.g., Powerpoint slides), images, audio files, multimedia content, web pages, blogs, etc. (which are collectively referred to herein illustratively and without limitation as a "file").

A workspace can generally refer to any grouping of a set of digital content in the collaboration platform. The grouping can be created, identified, or specified by a user or through other means. This user may be a creator user or administrative user, for example. In general, a workspace can be associated with a set of users or collaborators which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a work space and/or a user who created/uploaded a particular piece of content to the workspace, or any other designated user or collaborator.

In general, the collaboration platform allows multiple users or collaborators to access or collaborate efforts on content items such each user can upload, open, view/preview/see, edit, revise, comment upon, and/or annotate specific content items through their own user devices. For example, a user can upload a document to a work space for other users to access (e.g., for viewing, editing, commenting, signing-off, or otherwise manipulating). The user can login to the online platform and upload the document (or any other type of content item) to an existing work space or to a new work space. The document can be shared with existing users or collaborators in a work space.

In some embodiments, anomaly detection is performed by using a probability model that is based upon clusters, where the clusters are formed from entity/object relationships specifically identified or correlated to the interaction/storage aspects of the cloud-based collaboration platform. In particular, anomaly detection is performed with regards to user-file interactions using a probability model that predicts the likelihood of a user interacting with a file. In this approach, low probability events that satisfy certain other conditions are deemed to be suspicious and worthy of further analysis.

Figure 2:
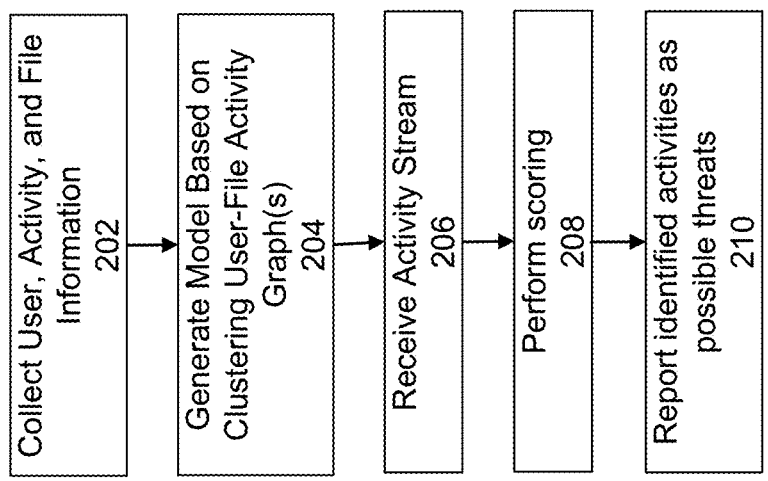
FIG. 2 shows a flowchart of an approach to perform anomaly detection according to some embodiments of the invention.

FIG. 2 shows a flowchart of an approach to use the system of FIG. 1 to perform anomaly detection. At 202, the process collects certain information that are used to generate the probability model 116, including user information 106, interaction/activity information 108, and file/content information 110. The user information 106 pertains to data regarding user/collaborators in the system, such as user identifiers, user roles, permissions, as well as other relevant data about users within the system. The interaction/activity information 108 pertains to any action that is performed on a content item by a given user, such as form example, upload, download, edit, change, modification, comment, view, and/or open of a file within the collaboration platform. The file/content information 110 pertains to information about files/content within the system, such as the file identifier, owner, edit times, and any other relevant information about the file.

At step 204, a model generator 112 generates a probability model 116 that is based upon clustering of user-file activity graph(s). The model generator 112 generates the model 116 based upon information received from the collaboration platform, including the user information 106, the interaction/activity information 108, and the file/content information 110. Further details regarding an illustrative approach to generate probability model 116 is describe below in conjunction with FIGS. 3-8.

At 206, an activity stream 114 is accessed by the anomaly-detection/behavior-analysis system 120. The activity stream 114 corresponds to a sequence of activities and interactions that take place between users and files within the collaboration system. Such activities and interactions include, for example, upload, downloads, comments, views/previews, and edits of files within the collaboration system.

Scoring is then performed, at 208, upon the activities that are identified within the activity stream. The scoring is performed using the probability model 116 to generate scores for some or all of the activities. Anomalies 122 can then be identified from the scored activities. Further details regarding an illustrative approach to perform scoring is described below in conjunction with FIGS. 9-10.

Thereafter, at 210, the anomalous events 122 can be reported as possible threats within the system. The reporting can be made, for example, to administrators at one or more admin consoles 130.

In some embodiments, the probability model can be embodied as one or more files that include the model contents described herein, which therefore results in a new type of file that is usable to perform behavior-based detection of potentially hostile, harmful or anomalous activity operations in the computing system, where the instant model-based approach embodied in the new type of file differs from traditional approaches to anomaly detection. As discussed in more detail below, the approach described herein therefore improves the functionality of the computing system by being able to identify potential threats in the computing system based upon paradigms of user-file interactions that exist in cloud-based management systems. In addition, the approach described herein improves the functionality of the computing system by allowing very efficient use of computing resources (reduced memory usage and faster processing) to perform the anomaly detection.

This disclosure will now describe an illustrative approach for generating a probability model according to some embodiments of the invention, where the probability model predicts the likelihood of a user interacting with a file. In this approach, low probability events that satisfy certain other conditions are deemed to be suspicious and worthy of further analysis.

Figure 3:
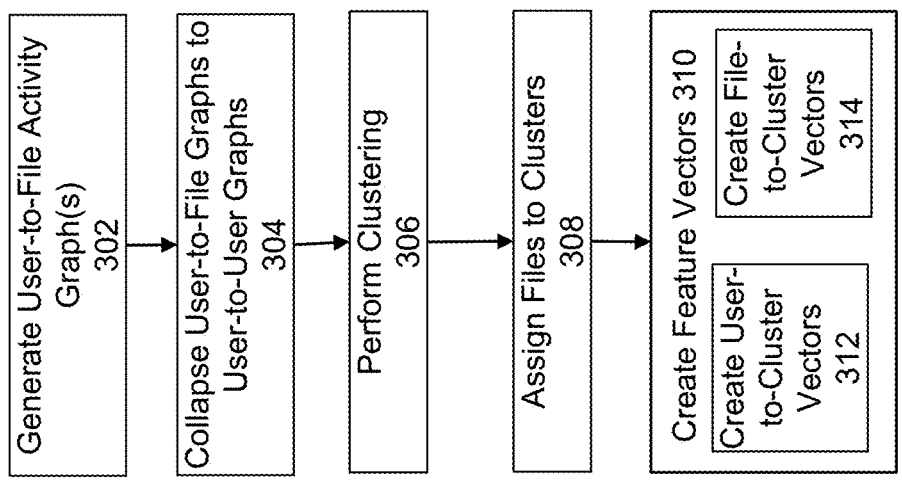
FIG. 3 shows a flowchart of an approach to generate a probability model according to some embodiments of the invention.

FIG. 3 shows a flowchart of an approach to generate a probability model according to some embodiments of the invention. At 302, one or more user-to-file activity graph(s) are generated. The activity graph is formed by identifying the interactions that occur between specific users and specific files within the system.

Figure 4:
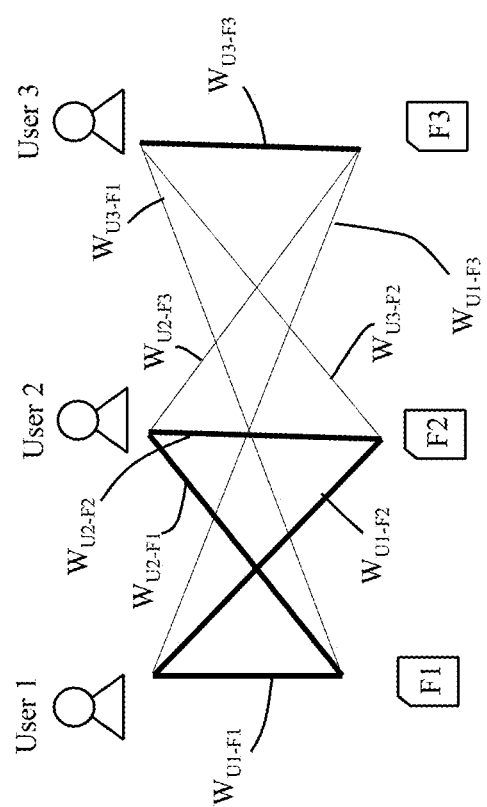
FIG. 4 illustrates formation of user-to-file graphs according to some embodiments of the invention.

FIG. 4 illustrates an example user-to-file activity graph for users 1, 2, 3 with respect to their interactions with files F1, F2, and F3. The users and files corresponds to nodes within the graph and the interactions correspond to edges within the graph. A "weight" is associated with each user-to-file interaction/edge in the activity graph. In some embodiments, the weight is calculated by summing the numbers of activities (and/or certain selected types of activities) between a specific user and a specific file. In the illustrated example of FIG. 4, it can be seen that certain of the edges are represented with thicker lines and certain edges have thinner lines. The thicker lines represent weights that indicate greater user-to-file activities (e.g., $W_{U1-F1}$, $W_{U1-F2}$, $W_{U2-F1}$, $W_{U2-F2}$, and $W_{U3-F3}$), while the thinner lines indicate lower levels of user-to-file activities (e.g., $W_{U1-F3}$, $W_{U2-F3}$, $W_{U3-F1}$, and $W_{U3-F2}$).

The activity graph can be formed by, for every file, generating a list of all users connected to that file. In some embodiments, pruning can be performed to prune the files with very high fan out. For example, this can be accomplished by sorting the files by their fan-out, and removing the top k % (e.g., where k is in the order of 0.1). In addition, the weights can be normalized based on the file fan out. To perform normalization in some embodiments, assume that "f" is the file's fan-out, e.g., the number of users connected to the file in the activity graph. Then, normalize every weight "w" of every user connected to this file by dividing it by an appropriate factor, e.g., $$w' = \frac{w}{1 + \alpha \log(f)}$$

where w is the original weight, w' is the normalized weight, and a is the normalization factor.

At 304, the user-to-file graph is collapsed to form a user-to-user file. This step is performed by factoring out the files in the file-user graph to generate the user-user graph. For example, this can be accomplished by, for every file shared by two users, adding the smaller file-user weight to the user-user link.

Figure 5:
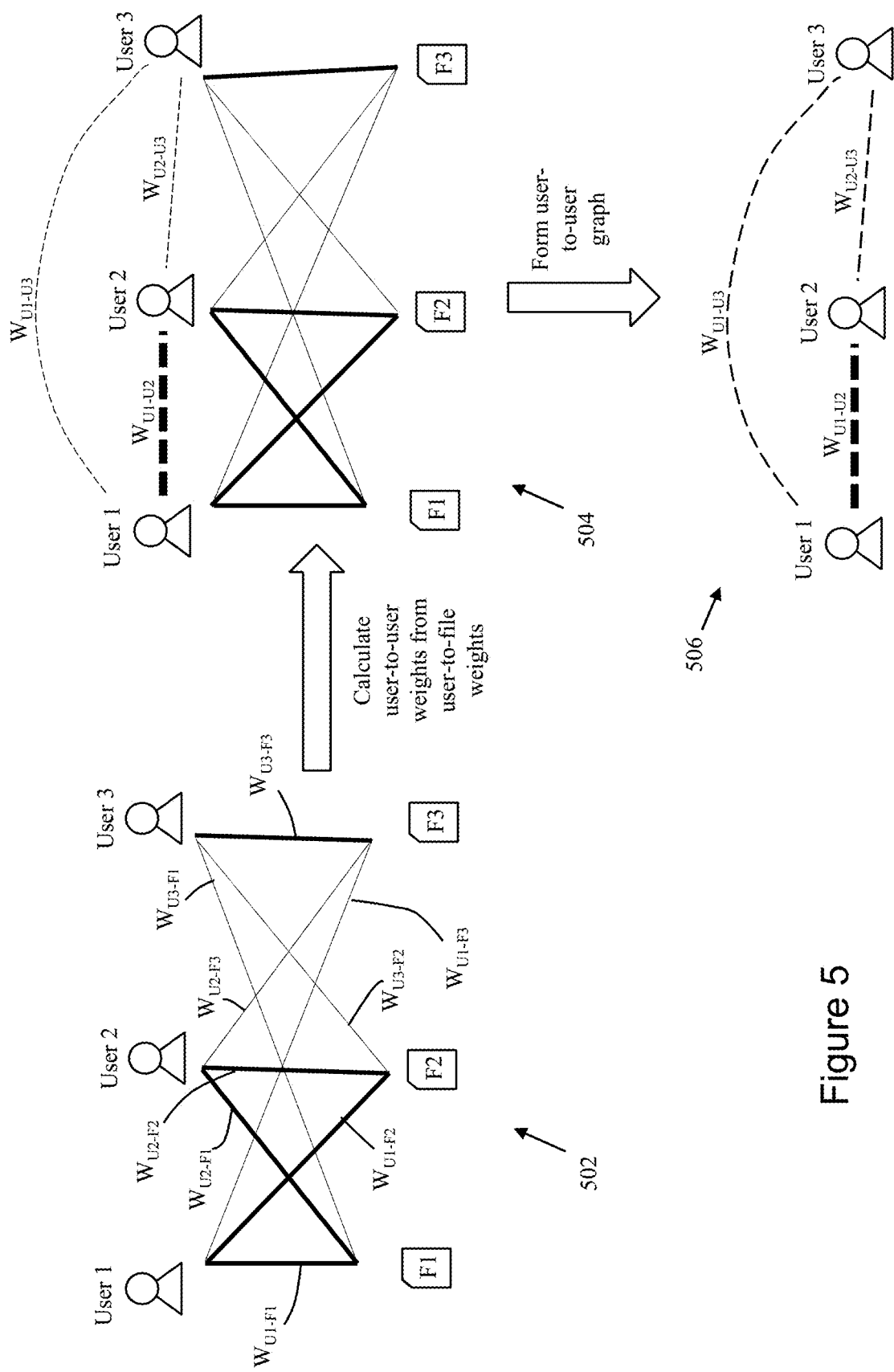
FIG. 5 illustrates formation of user-to-user graphs according to some embodiments of the invention.

FIG. 5 illustrates the process to generate the user-to-user graph from the user-to-file graph. Here, graph 502 represents the user-to-file activity graph. This graph 502 is reproduced from the graph described above in FIG. 4. Next, user-to-user weights are calculated from the user-to-file graph. This is represented in graph 504, where for example, $W_{U1-U2}$ represents the weights of the link between User 1 and User 2. Similarly, $W_{U1-U3}$ represents the weights of the link between User 1 and User 3, and $W_{U2-U3}$ represents the weights of the link between User 2 and User 3.

Any suitable approach to determining weight values can be employed in embodiments of the invention. In at least one embodiment, for every file shared by two users, the smaller file-to-user weight is added to a specific user-to-user link. For example, an illustrative approach to implementing weight $W_{U1-U2}$ is where this weight represents the smaller of the weights for the common files shared by User 1 and User 2. However, as would be understood by those of ordinary skill in the art, other approaches may also be employed to calculate these weights.

As can be seen in the figure, the weight $W_{U1-U2}$ of the link between user 1 and user 2 is represented by a thick line, indicating that the smaller of the weights for the common files shared by these two users (F1 and F2) is significant, indicating that these two users both tend to access the same set of files. On the other hand, the weights $W_{U1-U3}$ and $W_{U2-U3}$ are represented by thin lines, indicating that the smaller of the weights for the common files shared by these users is very small, indicating that user 1 and user 2 tend not to access the same files as user 3. Finally, as shown in graph 506, the user-to-user graph is formed by collapsing graph 504 to include just the users, as well as the links between the users.

Figure 6:
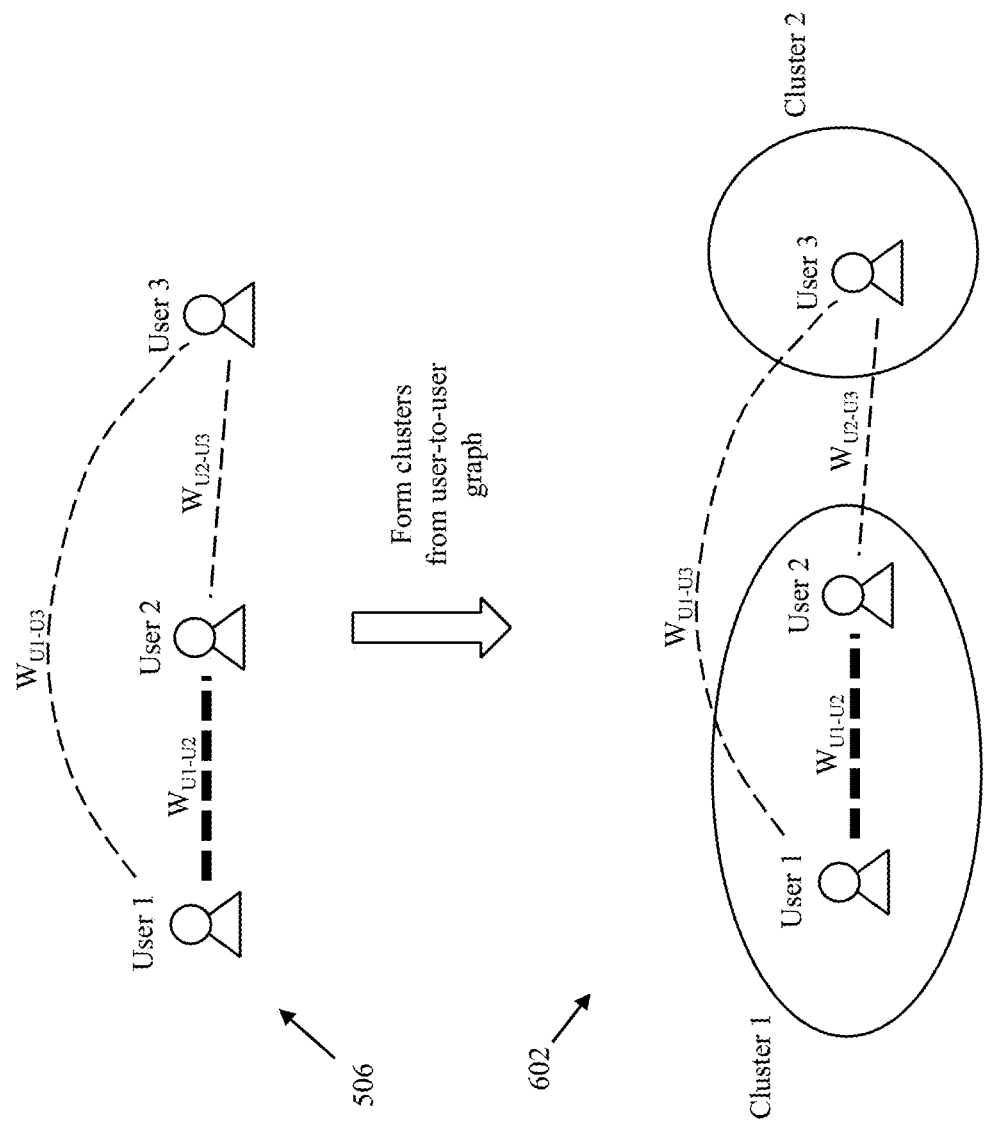
FIG. 6 illustrates clustering according to some embodiments of the invention.

At step 306, clustering is performed to cluster the user-to-user graph. This is illustrated in FIG. 6, where clustering is applied to graph 506 to identify users 1 and 2 in revised graph 602 as belonging to a first cluster, while user 3 is identified as belong to a second cluster. In some embodiments, Markov clustering can be used as the technique to cluster the user-user graph.

Next, at step 308, files are assigned to each of the clusters. The files to user clusters based on "affinity", where the affinity of the file is computed relative to each one of the user clusters. The file is assigned to the cluster that has highest affinity to it.

Figure 7:
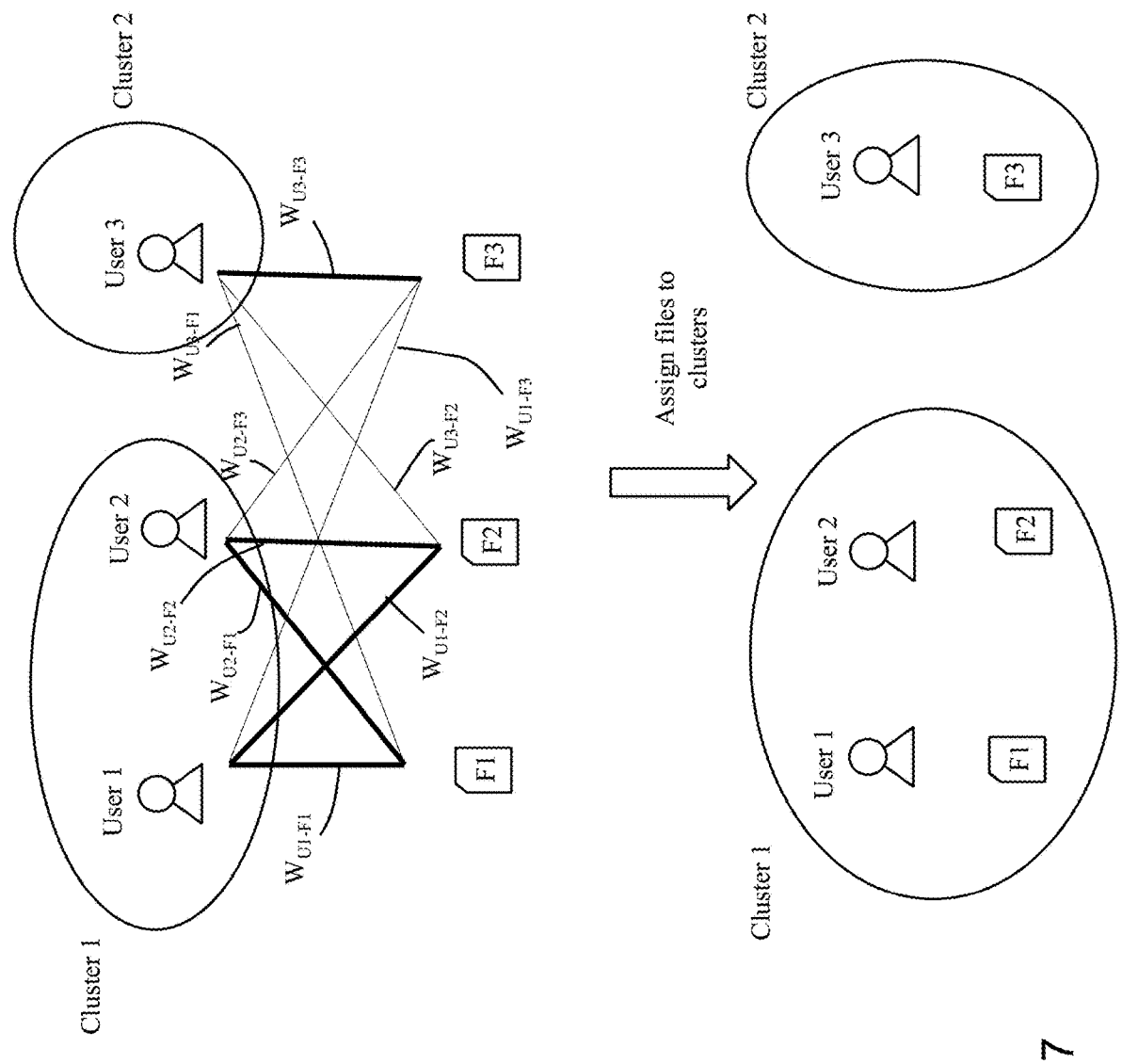
FIG. 7 illustrates association of files to clusters according to some embodiments of the invention.

With regards to affinity, it is noted that every cluster is a set of users and files. In some embodiments, the affinity of a file to a cluster is the sum of the weights of the connections between the file and all the users in the cluster. FIG. 7 provides an illustration of this approach, where files F1 and F2 are assigned to cluster 1. This is because the sum of the high weights of the connections between files F1 and F2 to the users 1 and 2 in cluster 1 (the weights $W_{U1-F1}$, $W_{U1-F2}$, $W_{U2-F1}$, $W_{U2-F2}$ with the thick lines) far exceeds the sum of the weights of the connections between files F1 and F2 to user 3 in cluster 2 (the weights $W_{U3-F1}$ and $W_{U3-F2}$ with the thin lines). In contrast, file 3 is assigned to cluster 2. This is because the sum of the high weight of the connection between file F3 to user 3 in cluster 2 (the weight $W_{U3-F3}$ with the thick line) far exceeds the sum of the weights of the connections between file F3 to users 1 and 2 in cluster 1 (the weights $W_{U1-F3}$ and $W_{U2-F3}$ with the thin lines).

Figure 8:
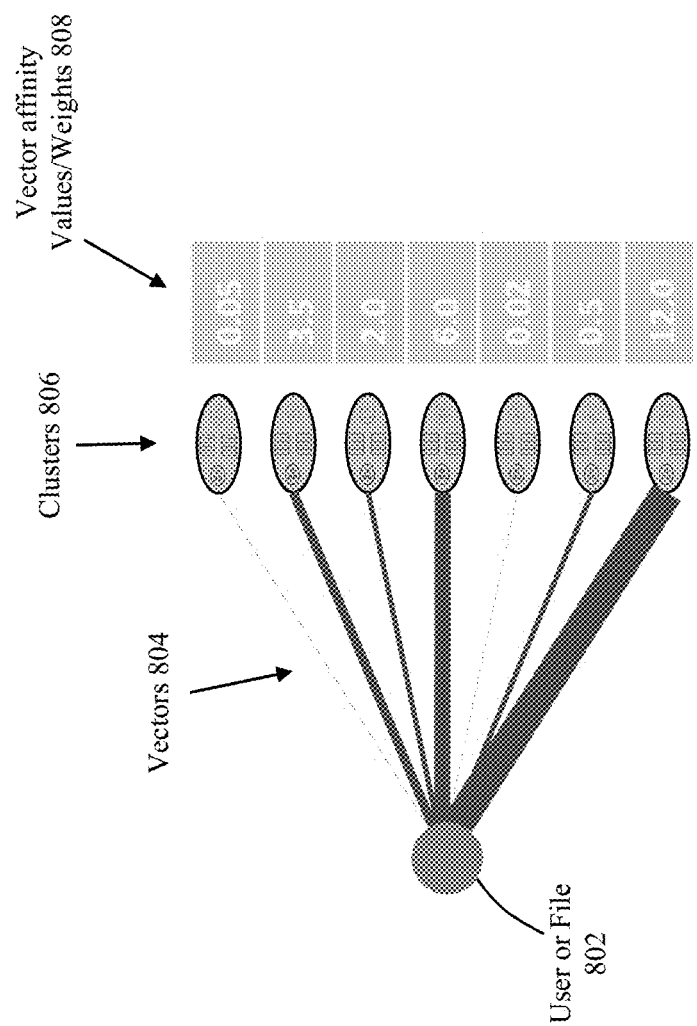
FIG. 8 illustrates example feature vectors according to some embodiments of the invention.

At step 310, feature vectors are created, including user-to-cluster vectors at step 312 and file-to-cluster vectors at step 314. FIG. 8 illustrates example feature vectors 804 between a user/file 802 and one or more clusters 806. Each feature vector 804 is associated with a vector affinity value/weight 808. The feature vector is an N-dimensional vector, where N is the number of clusters. For a file, the value at position k is the affinity of the file to cluster number k. For a user, the value at position k is the affinity of the user to cluster number k In some embodiments, for every file F and every user U, the approach computes feature vectors V(F) and W(U). In some embodiments, V and W have the same dimensions. The basic idea is that, if the feature extraction works well, the probability that U interacts with F is a monotonically increasing function of W(U).V(F), where W(U).V(F) is the inner product of W(U) and V(F).

The starting point for extracting the file and user feature vectors is the activity graph generated in the previous steps. The steps to calculate the feature vectors using activity graphs include some or all of (1): Cluster the activity graph into n clusters as discussed above, where these clusters are $c_1, c_2, \ldots c_n$; (2) For the file F, calculate the affinity of F to $c_1, c_2, \ldots, c_n$, resulting in $a_1, a_2, \ldots, a_n$, where $V(F)=(a_1, a_2, \ldots, a_n)$; (3) For the user U, calculate the affinity of U to $c_1, c_2, \ldots c_n$, resulting in $b_1, b_2, \ldots, b_n$, where $W(U)=(b_1, b_2, \ldots, b_n)$.

With regards to affinity, it is noted that every cluster is a set of users and files. The affinity of a file to a cluster is the sum of the weights of the connections between the file and all the users in the cluster. The affinity of a user to a cluster is the sum of the weights of the connections between the user and all the files in the cluster. The weights that are used for computing affinity can be the original, non-normalized weights.

In some embodiments, the feature vector integrates all activities for a respective user/file. For example, this means that all activities for a user relative to a cluster are combined together for a combined user-cluster vector. In an alternative embodiment, the clusters can be established having smaller levels of granularity. For example for a given user, each type of interaction by that user to a given cluster results in a separate feature cluster, where a first vector pertains to all "edit" actions by that user pertaining to a cluster, a second vector pertains to all "upload" actions by that user for the cluster, a third vector pertains to all "view" or "open" actions by that user for the cluster, a fourth vector pertains to all "comment" actions by that user for the cluster, and so on. Additional dimensions can be considered to create even finer granularities of vectors, e.g., to account for time of day, type of content, file extensions, etc.

Figure 9:
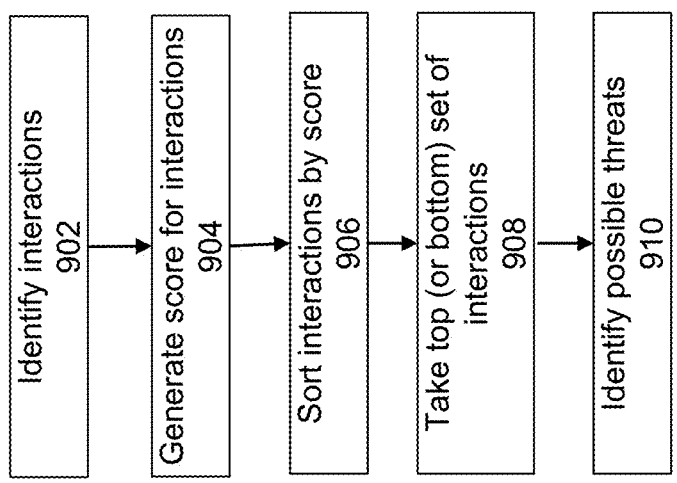
FIG. 9 shows a flowchart of an approach to generate scoring to perform behavioral analysis according to some embodiments of the invention.

Once the feature vectors have been generated, they can then be used for user behavioral analysis. FIG. 9 shows a flowchart of an approach to generate scoring to perform behavioral analysis according to some embodiments of the invention.

Figure 10:
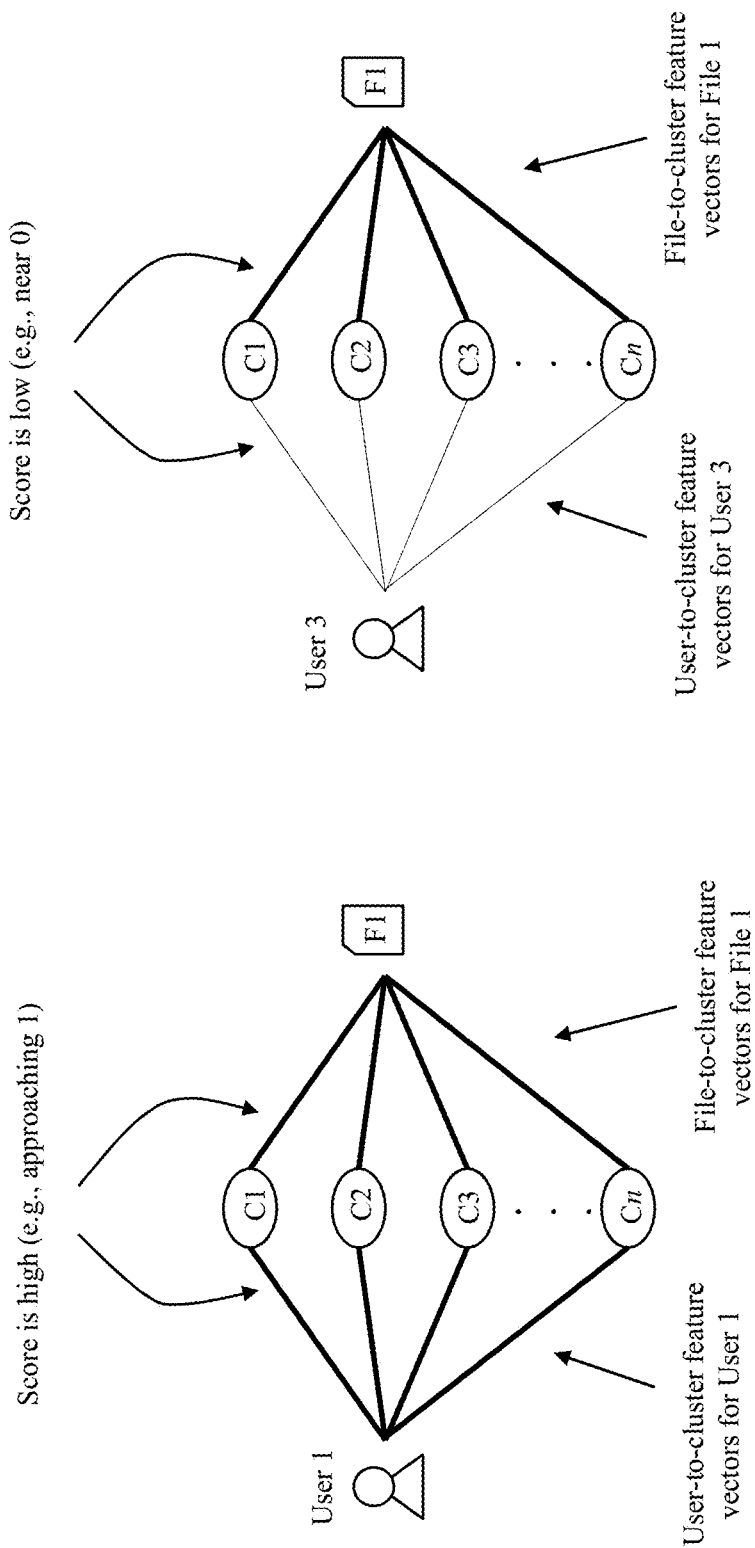
FIG. 10 illustrates scoring according to some embodiments.

At step 902, interactions between users and files are identified, e.g., from an activity stream. At 904, a score is generated for each of the identified interactions. The score can be determined, for example, by using the dot product/inner product of the user and file feature vectors. This is illustrated in FIG. 10, where the scoring is determined based upon the user and file vectors for User 1 and File 1 that results in a first score, while the scoring between the user and file vectors for User 3 and File 1 results in a second score. It is noted that any suitable approach for scoring can be employed in embodiments of the invention, and thus the inventive concepts disclosed herein are not limited to specific scoring approaches such as dot product/inner product or cosine similarity, unless explicitly claimed as such.

In this illustrative example on the left side of the figure, it can be seen that the weight of the user and file vectors for User 1 and File 1 all correspond to thick lines indicating high vector weights. This shows a historical access pattern of consistent accesses to File 1 by User 1. Therefore, the dot product of the vectors in this situation will likely results in a very high score.

In contrast, on the right side of the figure, it can be seen that the weight of the user vectors for User 3 correspond to thin lines representing low vector weights, which are markedly different from the thick lines for the file vectors representing high vector weights. This disparity shows a historical access pattern of inconsistent accesses to File 1 by User 3. Therefore, the dot product of the vectors in this situation will likely results in a very low score.

As previously noted, the feature vectors may be generated at various levels of granularity. This means that scoring may be determined as well at the different levels of granularity, in correspondence with the type of feature vector that is used.

At step 906, the interactions are then sorted by their scores. Next, at step 908, the top or bottom set of interactions are identified. The choice of whether to take the top or bottom scores is dependent upon the type of scoring that is used. For example, if product scoring is employed, then the bottom nth interactions are identified, e.g., the bottom 1% of the scored interactions. One reason for taking the top (or bottom) percentage is to reduce the amount of data that would otherwise need to be processed to identify the possible threats. By significantly reducing the quantity of data to be processed in downstream processing (by eliminating the vast majority of the scored data), this approach eliminates interactions that are less likely to be a threat, reduces the amount of data that needs to be held in memory for processing, and increases the speed of processing since less data would therefore need to be operated upon to identify the potential threats.

At 910, the possible threats are then identified from the data set. In some embodiments, this is accomplished by determining the count of users that appear in the bottom 1% of the scored interactions, where the user(s) having the greatest number of interactions in the bottom 1% are highlighted as behavioral anomalies.

In some embodiments, the possible threats are identified by creating an alert that is sent to an administrator. In an alternate embodiment, the potential threat is automatically processed to mitigate possible exposure to the threat, e.g., by blocking and/or throttling access to one or more files by one or more users. For example, one possibility is to temporarily block all file access in the cloud management system by users identified in the bottom nth interactions. In an alternate embodiment, access is only blocked for the identified users for interactions that have scores below (or above) a certain threshold level that are indicative of anomalous access. In yet another embodiment, throttling is applied to limit the amount and/or rate of content access that is accessible for identified users/files.

Therefore, what has been described is an improved approach to implement anomaly detection, where the approach uses the probabilities of user-file interaction (determined using the inner product of user and file feature vectors) to identify sequence(s) of low-probability events that may be anomalous. Here, a single low-probability event is when a file that is normally accessed only by a particular cluster is accessed by a user of a different cluster who does not access other clusters often. The file access patterns and user access patterns are thus both employed to identify user behavior that are out-of-character.

It is noted that the above-described cluster-based approach to model generation is advantageous because it allows the effective capture of inter-dependencies in the data that correlates to how people actually work together within the enterprise/system. This is because the clusters correspond to team activities and reflect the natural organization of an enterprise. In addition, the cluster-based approach provides a flexible representation having the ability to incorporate different node and edge types within the representations, while making the graphs less sparse. In effect, the models based upon clustering allows grouping of documents based upon patterns of use and are highly predictive of user behavior. Moreover, the present approach is also very robust to adversaries, making it difficult for fraudsters to understand the whole network and how specific entities/interactions fit in.

The inventive approach described herein is also advantageous over conventional machine learning techniques. For example, many conventional supervised machine learning techniques are dependent upon the existence of labelled data, and will therefore fail if accurate labels are not available for collected data. In contrast, the present approach is highly effective even if labeled data does not exist, since the inventive technique does not need to ground truth labels for what kind of activity is anomalous or not. In addition, conventional machine learning techniques often fail in large systems having extensively changing interactions that are very complex. In contrast, the inventive approach is expressly adapted to handle large scale and complex interactions, where the complex interactions between users and files may change over time. In addition, many conventional techniques for anomaly detection rely upon sniffing of network traffic to gather packets that are analyzed based upon packet metadata, where this approach is suboptimal because it is difficult if not impossible to always identify with certainty specific user/file interactions just from looking at individual packets (such as distinguishing open, edit, comment interactions from one another). In contrast, the inventive approach works upon an activity stream and directly performs anomaly detection using user-file interactions that exist in content management systems.

System Architecture Overview
Additional System Architecture Examples

Figure 11A:
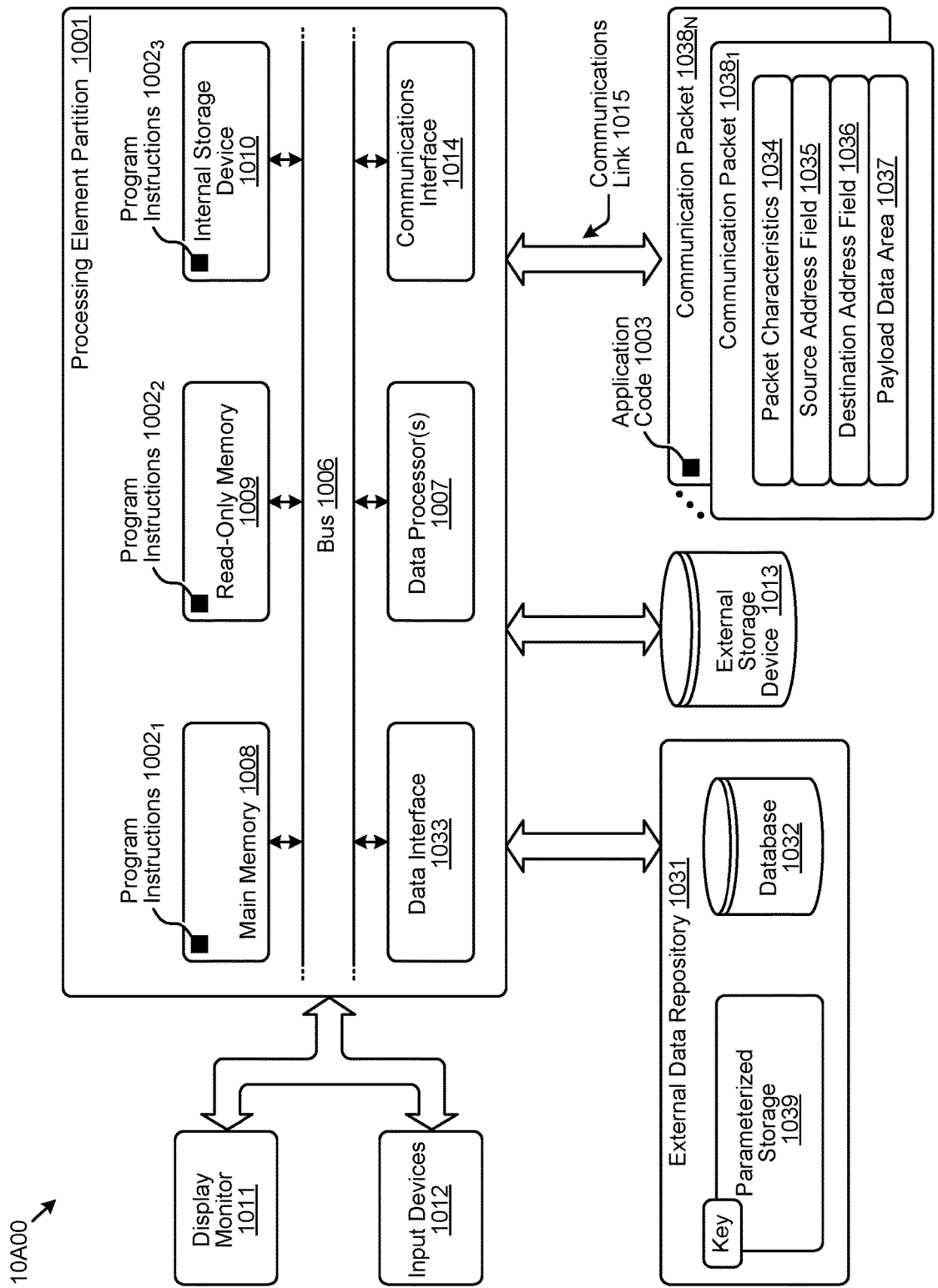
FIG. 11A and FIG. 11B depict exemplary architectures of components suitable for implementing embodiments of the present disclosure, and/or for use in the herein-described environments.

FIG. 11A depicts a block diagram of an instance of a computer system 10A00 suitable for implementing embodiments of the present disclosure. Computer system 10A00 includes a bus 1006 or other communication mechanism for communicating information. The bus interconnects subsystems and devices such as a CPU, or a multi-core CPU (e.g., processor 1007), a system memory (e.g., main memory 1008, or an area of random access memory RAM), a non-volatile storage device or area (e.g., ROM 1009), an internal or external storage device 1010 (e.g., magnetic or optical), a data interface 1033, a communications interface 1014 (e.g., PHY, MAC, Ethernet interface, modem, etc.). The aforementioned components are shown within processing element partition 1001, however other partitions are possible. The shown computer system 10A00 further comprises a display 1011 (e.g., CRT or LCD), various input devices 1012 (e.g., keyboard, cursor control), and an external data repository 1031.

According to an embodiment of the disclosure, computer system 10A00 performs specific operations by processor 1007 executing one or more sequences of one or more program code instructions contained in a memory. Such instructions (e.g., program instructions $1002_1$, program instructions $1002_2$, program instructions $1002_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination therefrom.

According to an embodiment of the disclosure, computer system 10A00 performs specific networking operations using one or more instances of communications interface 1014. Instances of the communications interface 1014 may comprise one or more networking ports that are configurable (e.g., pertaining to speed, protocol, physical layer characteristics, media access characteristics, etc.) and any particular instance of the communications interface 1014 or port thereto can be configured differently from any other particular instance. Portions of a communication protocol can be carried out in whole or in part by any instance of the communications interface 1014, and data (e.g., packets, data structures, bit fields, etc.) can be positioned in storage locations within communications interface 1014, or within system memory, and such data can be accessed (e.g., using random access addressing, or using direct memory access DMA, etc.) by devices such as processor 1007.

The communications link 1015 can be configured to transmit (e.g., send, receive, signal, etc.) communications packets 1038 comprising any organization of data items. The data items can comprise a payload data area 1037, a destination address 1036 (e.g., a destination IP address), a source address 1035 (e.g., a source IP address), and can include various encodings or formatting of bit fields to populate the shown packet characteristics 1034. In some cases the packet characteristics include a version identifier, a packet or payload length, a traffic class, a flow label, etc. In some cases the payload data area 1037 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to processor 1007 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 1031, which in turn can be formatted into any one or more storage areas, and which can comprise parameterized storage 1039 accessible by a key (e.g., filename, table name, block address, offset address, etc.).

Execution of the sequences of instructions to practice certain embodiments of the disclosure are performed by a single instance of the computer system 10A00. According to certain embodiments of the disclosure, two or more instances of computer system 10A00 coupled by a communications link 1015 (e.g., LAN, PTSN, or wireless network) may perform the sequence of instructions required to practice embodiments of the disclosure using two or more instances of components of computer system 10A00.

The computer system 10A00 may transmit and receive messages such as data and/or instructions organized into a data structure (e.g., communications packets 1038). The data structure can include program instructions (e.g., application code 1003), communicated through communications link 1015 and communications interface 1014. Received program code may be executed by processor 1007 as it is received and/or stored in the shown storage device or in or upon any other non-volatile storage for later execution. Computer system 10A00 may communicate through a data interface 1033 to a database 1032 on an external data repository 1031. Data items in a database can be accessed using a primary key (e.g., a relational database primary key).

The processing element partition 1001 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a processor 1007. Some embodiments include one or more special-purpose hardware components (e.g., power control, logic, sensors, transducers, etc.). A module may include one or more state machines and/or combinational logic used to implement or facilitate the performance characteristics of systems for dynamically monitoring code execution activity to identify and manage inactive code.

Various implementations of the database 1032 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of dynamically monitoring code execution activity to identify and manage inactive code). Such files or records can be brought into and/or stored in volatile or non-volatile memory.

Figure 11B:
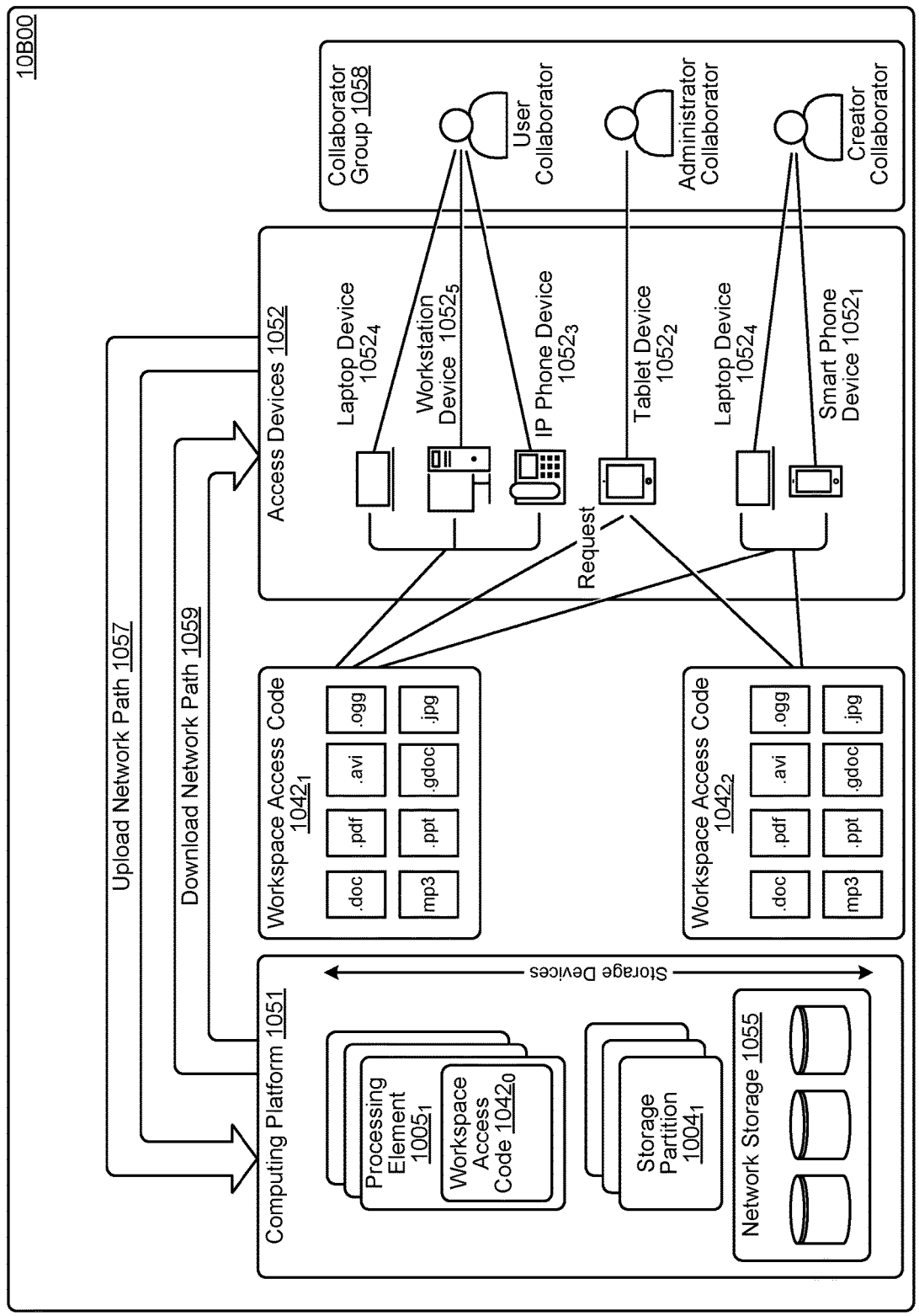

FIG. 11B depicts a block diagram of an instance of a cloud-based environment 10B00. Such a cloud-based environment supports access to workspaces through the execution of workspace view code (e.g., workspace access code $1052_1$ and workspace access code $1052_2$. Workspace access code can be executed on any of the shown user devices 1056 (e.g., laptop device $1056_4$, workstation device $1056_5$, IP phone device $1056_3$, tablet device $1056_2$, smart phone device $1056_1$, etc.), or on one or more processing elements. A group of users can form a collaborator group 1058, and a collaborator group can be comprised of any types or roles of users. For example, and as shown, a collaborator group can comprise a user collaborator, an administrator collaborator, a creator collaborator, etc. Any user can use any one or more of the user devices, and such user devices can be operated concurrently to provide multiple concurrent sessions and/or other techniques to access workspaces through the workspace access code.

A portion of workspace access code can reside in and be executed on any user device. Also, a portion of the workspace access code can reside in and be executed on any computing platform, including in a middleware setting. As shown, a portion of the workspace access code resides in and can be executed on one or more processing elements (e.g., processing element $1053_1$). The workspace access code can interface with storage devices such the shown network storage 1055. Storage of workspaces and/or any constituent files or objects, and/or any other code or scripts or data can be stored in any one or more storage partitions (e.g., storage partition $1054_1$). In some environments, a processing element includes forms of storage such as RAM and/or ROM and/or FLASH, and/or other forms of volatile and non-volatile storage.

A stored workspace can be populated via an upload (e.g., an upload from a user device to a processing element over an upload network path 1057). A stored workspace can be delivered to a particular user and/or shared with other particular users via a download (e.g., a download from a processing element to a user device over a download network path 1059).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method of predicting user-file interactions, comprising:
   identifying user-to-file interactions in a collaboration system;
   generating a model at least by converting a user-to-file activity graph into a user-to-user graph into a converted user-to-user graph and subsequently generating one or more clusters from the converted user-to-user graph, wherein
      the user-to-user graph is generated at least by removing a file node in the user-to-file activity graph,
      the user-to-file activity graph is formed from the user-to-file interactions, and
      the user-to-file activity graph comprises at least a user node representing a user on the collaboration system, the file node representing a data object stored in the collaboration system, and an edge connecting the user node and the file node;
   receiving an activity stream for the collaboration system, the activity stream corresponding to interactions in the collaboration system;
   scoring the interactions using the model that is based at least in part upon the converted user-to-user graph to generate interaction scores based at least in part on a combination of a user-to-cluster vector and a file-to-cluster vector; and
   identifying an anomaly in the collaboration system based at least in part upon the interaction scores associated with a determined number of the interactions.

2. The method of claim 1, wherein the model is generated by:
   generating the user-to-file activity graph at least by respectively adding a plurality of users as a plurality of user nodes and by respectively adding a plurality of data objects as a plurality of file nodes into the user-to-file activity graph and further by linking one or more user nodes with at least one of the file node with one or more respective edges;
   generating the converted user-to-user graph at least by converting the user-to-file activity graph, converting the user-to-file activity graph comprising:
      removing the plurality of file nodes respectively representing the plurality of data objects in the user-to-file activity graph; and
      adding a user-to-user edge between at least two user nodes based at least in part upon object information pertaining to the file node, which has been removed, and user information about the at least two user nodes;
   generating the one or more clusters from the user-to-user graph;
   assigning a data object of the plurality of data objects that have been filtered out to a corresponding cluster of the one or more clusters based at least in part upon a respective file affinity to each of at least some clusters of the one or more clusters, wherein a cluster of the one or more clusters includes a group of users and at least one data object; and
   generating feature vectors from the user-to-file graph based at least in part upon which the one or more clusters are generated.

3. The method of claim 2, wherein the feature vectors comprise the user-to-cluster vector and the file-to-cluster vector, and dimensionality of a feature vector is equal to a total number of the one or more clusters.

4. The method of claim 1, wherein the user-to-file activity graph is formed by, for each data object, representing the each data object as a first user node of a plurality of first user nodes, generating a list of all users connected to the each data object, representing the list of all users connected to the each data object as a plurality of file nodes comprising the file node, and respectively connecting the user node with the plurality of file nodes with a plurality of respective edges.

5. The method of claim 1, wherein normalization is applied to the user-to-file activity graph at least by performing a set of acts that comprises:
   determining a fanout for the data object; and
   modifying a weight for the user of the plurality of users connected to the data object in the user-to-file activity graph based at least in part upon the fanout.

6. The method of claim 1, wherein scoring the interactions comprising:
   generating the interaction scores for the interactions at least by respectively generating a respective score for each interaction of the interactions by using the user-to-cluster vector and the file-to-cluster vector;
   sorting the interactions by the interaction scores;
   identifying a top set or a bottom set of interactions from the interactions based at least in part upon the interaction scores; and
   identifying the anomaly at least by identifying a first user that corresponds to a largest number of the interactions from the top set or the bottom set.

7. The method of claim 6, wherein generating the interaction scores comprises respectively determining a dot product of the user-to-cluster vector and the file-to-cluster vector, and the user-to-user graph is generated by filtering out the file node representing the data object from the user-to-file activity graph.

8. A computer program product, embodied in a non-transitory computer readable medium having stored thereon a sequence of instructions which, when executed by a microprocessor, causes the microprocessor to execute a set of acts, the set of acts comprising:
   identifying user-to-file interactions in a collaboration system;
   generating a model at least by converting a user-to-file activity into a user-to-user graph into a converted user-to-user graph and subsequently generating one or more clusters from the converted user-to-user graph for the model, wherein
      the user-to-user graph is generated at least by removing a file node in the user-to-file activity graph,
      the user-to-file activity graph is formed from the user-to-file interactions, and
      the user-to-file activity graph comprises at least a user node representing a user on the collaboration system, a file node representing a data object stored in the collaboration system, and an edge connecting the user node and the second node;
   receiving an activity stream for the collaboration system, the activity stream corresponding to interactions in the collaboration system;
   scoring the interactions using the model that is based at least in part upon the users-to-user graph to generate interaction scores based at least in part on a combination of a user-to-cluster vector and a file-to-cluster vector; and
   identifying an anomaly in the collaboration system based at least in part upon the interaction scores associated with a determined number of the interactions.

9. The computer program product of claim 8, wherein the computer readable medium further includes instruction to execute a process to generate the model, comprising:
generating the user-to-file activity graph at least by respectively adding a plurality of users as the plurality of user nodes and by respectively adding a plurality of data objects as a plurality of file nodes into the user-to-file activity graph and further by linking one or more user nodes with at least one of the file node with one or more respective edges;
generating the converted user-to-user graph at least by converting the user-to-file activity graph, converting the user-to-file activity graph comprising:
filtering out the plurality of file nodes respectively representing the plurality of data objects in the user-to-file activity graph;
adding a user-to-user edge between the at least two user nodes based at least in part upon object information pertaining to the file node, which has been filtered out, and user information about the at least two user nodes, and
the file node representing the data object is removed from the user-to-file activity graph to form the user-to-user graph;
generating the one or more clusters from the user-to-user graph;
assigning a data object of the plurality of data objects that have been filtered out to a corresponding cluster of the clusters based at least in part upon a respective file affinity to each of at least some clusters of the cluster, wherein a cluster of the clusters include a group of users and at least one data object; and
generating feature vectors from the user-to-file graph based at least in part upon which the clusters are generated.

10. The computer program product of claim 9, wherein the feature vectors comprise the user-to-cluster vector and the file-to-cluster vector, and dimensionality of a feature vector is equal to a total number of the one or more clusters.

11. The computer program product of claim 8, wherein the user-to-file activity graph is formed by, for each data object, representing the each data object as a first user node of the plurality of user nodes, generating a list of all users connected to the each data object, representing the list of all users connected to the each data object as a plurality file nodes comprising the file node, and respectively connecting the first user node with the plurality of user nodes with a plurality of respective edges.

12. The computer program product of claim 8, wherein normalization is applied to the user-to-file activity graph at least by performing a first set of acts that comprises:
determining a fanout for the data object; and
modifying a weight for the user of the plurality of users connected to the data object in the user-to-file activity graph based at least in part upon the fanout.

13. The computer program product of claim 8, wherein the computer readable medium further includes instruction to score the interactions, comprising:
generating the interaction scores for the interactions at least by respectively generating a respective score for each interaction of the interactions by using the user-to-cluster vector and the file-to-cluster vector;
sorting the interactions by the interaction scores;
identifying a top set or a bottom set of interactions from the interactions based at least in part upon the scores; and
identifying the anomaly by identifying a first user that corresponds to a largest number of the interactions from the top or bottom set.

14. The computer program product of claim 13, wherein generating the interaction scores comprises respectively determining a dot product of the user-to-cluster vector and the file-to-cluster vector, and the user-to-user graph is generated by filtering out the user node representing the data object from the user-to-file activity graph.

15. A system comprising:
a microprocessor;
a memory for holding programmable code, wherein the programmable code includes instructions which, when executed by the microprocessor, cause the microprocessor to perform a set of acts, and the set of acts comprises:
identifying user-to-file interactions in a collaboration system;
generating a model at least by converting a user-to-file activity graph into a user-to-user graph into a converted user-to-user graph and subsequently generating one or more clusters from the converted user-to-user graph for the model, wherein
the user-to-file activity graph is formed from the user-to-file interactions, and
the user-to-file activity graph comprises at least a user node representing a user on the collaboration system, the file node representing a data object stored in the collaboration system, and an edge connecting the user node and the file node, and
receiving an activity stream for the collaboration system, the activity stream corresponding to interactions in the collaboration system;
scoring the interactions using the model that is based at least in part upon the converted user-to-user graph to generate interaction scores based at least in part on a combination of a user-to-cluster vector and a file-to-cluster vector, and
identifying an anomaly in the collaboration system based at least in part upon the interaction scores associated with a determined number of the interactions.

16. The system of claim 15, wherein the programmable code further includes instruction to execute a process to generate the model, comprising:
generating the user-to-file activity graph at least by respectively adding a plurality of users as the plurality of user nodes and by respectively adding a plurality of data objects as plurality of file nodes into the user-to-file activity graph and further by linking one or more user nodes with at least one of the file node with one or more respective edges;
generating the converted user-to-user graph at least by converting the user-to-file activity graph, converting the user-to-file activity graph comprising:
filtering out the plurality of file nodes respectively representing the plurality of data objects in the user-to-file activity graph; and
adding a user-to-user edge between the at least two user nodes based at least in part upon object information pertaining to the file node, which has been filtered out, and user information about the at least two user nodes;
generating the one or more clusters from the user-to-user graph;
assigning a data object of the plurality of data objects that have been filtered out to a corresponding cluster of the one or more clusters based at least in part upon a respective file affinity to each of at least some clusters of the one or more cluster, wherein a cluster of the one or more clusters include a group of users and at least one data object; and generating feature vectors from the user-to-file graph based at least in part upon which the one or more clusters are generated.

17. The system of claim 16, wherein the feature vectors comprise the user-to-cluster vector and the file-to-cluster vector, and dimensionality of a feature vector is equal to a total number of the one or more clusters.

18. The system of claim 15, wherein the user-to-file activity graph is formed by, for each data object, representing the each data object as a first user node of a plurality of user nodes, generating a list of all users connected to the each data object, representing the list of all users connected to the each data object as a plurality of file nodes comprising the file node, and respectively connecting the user node with the plurality of file nodes with a plurality of respective edges.

19. The system of claim 15, wherein normalization is applied to the user-to-file activity graph at least by performing a set of acts that comprises:

determining a fanout for the data object; and modifying a weight for the user of the plurality of users connected to the data object in the user-to-file activity graph based at least in part upon the fanout.

20. The system of claim 15, wherein the programmable code further includes instruction to score the interactions, comprising:

generating the interaction scores for the interactions at least by respectively generating a respective score for each interaction of the interactions by using the user-to-cluster vector and the file-to-cluster vector;

sorting the interactions by the interaction scores;

identifying a top set or a bottom set of interactions from the interactions based at least in part upon the interaction scores; and identifying the anomaly at least by identifying a first user that corresponds to a largest number of the interactions from the top set or the bottom set.

21. The system of claim 20, wherein the interaction scores are generated by respectively determining a dot product of the user-to-cluster vector and the file-to-cluster vector, and the user-to-user graph is generated by filtering out the file node representing the data object from the user-to-file activity graph.

* * * * *